(No Model.)

J. M. WANNAMAKER.
THILL COUPLING.

No. 279,996. Patented June 26, 1883.

WITNESSES
Wm A. Skinkle
J. W. Young

INVENTOR
John M. Wannamaker.
By his Attorney

UNITED STATES PATENT OFFICE.

JOHN M. WANNAMAKER, OF TRENTON, MISSOURI.

THILL-COUPLING.

SPECIFICATION forming part of Letters Patent No. 279,996, dated June 26, 1883.

Application filed February 6, 1883. (No model.)

*To all whom it may concern:*

Be it known that I, JOHN M. WANNAMAKER, a citizen of the United States, residing at Trenton, in the county of Grundy and State of Missouri, have invented certain new and useful Improvements in Thill-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification, in which—

Figure 1:
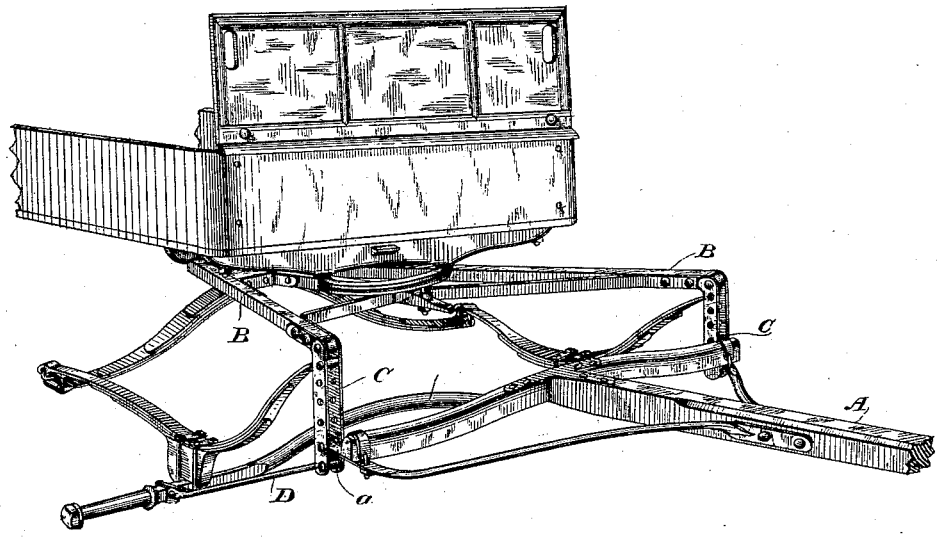
Figure 2:
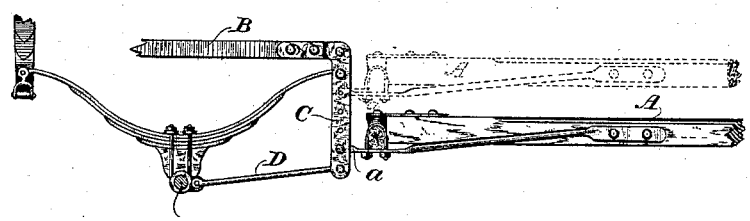

Figure 1 is a perspective view of the front portion of a vehicle with my device applied thereto. Fig. 2 is a detail view, showing the general construction of my device.

Similar letters denote like parts.

The invention relates to an improved form of thill-coupling, whereby the thills or pole may be adjusted to suit the requirements of the load and team; and it consists in attaching to some convenient portion of the framework below the fifth-wheel, and also to the front axle of any vehicle, a link having suitable perforations for the connecting-bolt, and within which the thills or pole may be adjusted vertically, as desired.

A represents the thills or cross-tree, and a a are the pieces or lugs usually provided for connecting the same to the vehicle.

B B are bars forming the spring-frame, above which the fifth-wheel or turn-table is usually located. To the ends of these bars, or to any similar projections or frame-work, I attach, by bolt passing therethrough or by an ordinary shackle, the links C C, which should be about twelve inches long, and be provided with holes for the passage of the bolt that secures the thill-iron in any one of the positions indicated when the same is placed therein. From the lower ends of the links C C extend the rods D, which are pivoted within or to the lower portion of each link, and are secured directly to the axle, or, below it, to the clip that holds the springs. By either mode of attachment the links and thrust-rod D become a part of and move with the axle and front wheels, whether springs are used or not, and being so utilized can be attached to vehicles having two or four wheels, it only being essential to have a sufficient distance between the lower portion of the axle and the turn-table to afford support for the extremities of the links.

Having described my invention, I claim—

1. The combination, with the axle and spring-frame of a vehicle, of the herein-described thill-coupling, consisting, essentially, of a pair of suitably-apertured links provided with a series of transverse perforations, and secured vertically between the upper portion of the spring-frame and the axle, and means for adjusting the ordinary thill-lugs within said links, substantially as set forth.

2. The combination, with a suitable axle and spring-frame, of the links C C, perforated with a series of holes, the rod D, and thills or pole having lugs a a, substantially as shown and described.

In testimony whereof I affix my signature in presence of two witnesses.

JOHN M. WANNAMAKER.

Witnesses:
J. A. SHANKLIN,
LUTHER COLLIER.